US007464627B2

(12) United States Patent
Ko et al.

(10) Patent No.: US 7,464,627 B2
(45) Date of Patent: Dec. 16, 2008

(54) PASSIVE ENTRY ACTUATOR

(75) Inventors: Knight Ko, Quincy, MA (US); Brian Ganter, Foxborough, MA (US); Thomas P Schregardus, Somerville, MA (US); Eric Beishline, Marlborough, MA (US); William H. Fort, Stratham, NH (US)

(73) Assignee: Stoneridge Control Devices, Inc., Canton, MA (US)

( * ) Notice: Subject to any disclaimer, the term of this patent is extended or adjusted under 35 U.S.C. 154(b) by 0 days.

(21) Appl. No.: 11/553,922

(22) Filed: Oct. 27, 2006

(65) Prior Publication Data

US 2007/0152455 A1 Jul. 5, 2007

Related U.S. Application Data

(60) Provisional application No. 60/730,780, filed on Oct. 27, 2005, provisional application No. 60/733,741, filed on Nov. 4, 2005, provisional application No. 60/777,808, filed on Mar. 1, 2006.

(51) Int. Cl.
*E05C 3/06* (2006.01)
*F03G 1/00* (2006.01)

(52) U.S. Cl. ........................... 74/625; 74/25; 74/89.14; 185/39; 185/40 B; 185/40 H; 292/142; 292/144

(58) Field of Classification Search .................... 74/25, 74/89.14, 523, 532, 575, 625; 185/37, 38, 185/39, 40 B, 40 H; 292/138, 139, 142, 143, 292/144, 157, 160, 161, 164
See application file for complete search history.

(56) References Cited

U.S. PATENT DOCUMENTS

| | | | | |
|---|---|---|---|---|
| 2,296,233 | A * | 9/1942 | Fields | 192/139 |
| 5,503,441 | A * | 4/1996 | Schwaiger | 292/336.3 |
| 6,786,070 | B1 | 9/2004 | Dimig et al. | |
| 7,111,877 | B2 * | 9/2006 | Larsen et al. | 292/216 |

OTHER PUBLICATIONS

International Search Report and Written Opinion mailed Oct. 1, 2007 in corresponding PCT Patent Application No. PCT/US06/60320.

* cited by examiner

*Primary Examiner*—William C Joyce
(74) *Attorney, Agent, or Firm*—Grossman, Tucker, Perreault & Pfleger, PLLC

(57) ABSTRACT

An actuator and door latch system incorporating the same. The actuator moves a door latch between locked and unlocked positions with rapidity using a gear train directly coupled to an actuator motor or energy stored in an energy storage element such as a spring.

8 Claims, 22 Drawing Sheets

PASSIVE ENTRY ACTUATOR

CROSS-REFERENCE TO RELATED APPLICATIONS

This application claims the benefit of U.S. provisional patent application Ser. No. 60/730,780, filed on Oct. 27, 2005 and also claims the benefit of U.S. provisional patent application Ser. No. 60/733,741, filed on Nov. 4, 2005 and also claims the benefit of U.S. provisional patent application Ser. No. 60/777,808, filed on Mar. 1, 2006, the teachings of which applications are hereby incorporated herein by reference.

FIELD

This application relates in general to electromechanical actuators, and, in particular, to a passive entry actuator for opening a vehicle door.

BACKGROUND

In some circumstances, it may be convenient for a vehicle door to open/unlatch without requiring an operator to impart a significant force to the door. Unlatching of the vehicle door may be automatically accomplished, for example, when an authorized operator approaches the vehicle and/or unlocks the vehicle using a keyed or keyless entry mechanism. Keyless entry mechanisms include user keys positioned at the exterior of the vehicle for allowing a user to input a pass code for changing the door lock state. In another method, keyless entry may be achieved by generation of a signal, e.g. from a key fob or other local or remote transmitting device, which is received by the vehicle to cause a change in the lock state of the doors.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Figure 1:
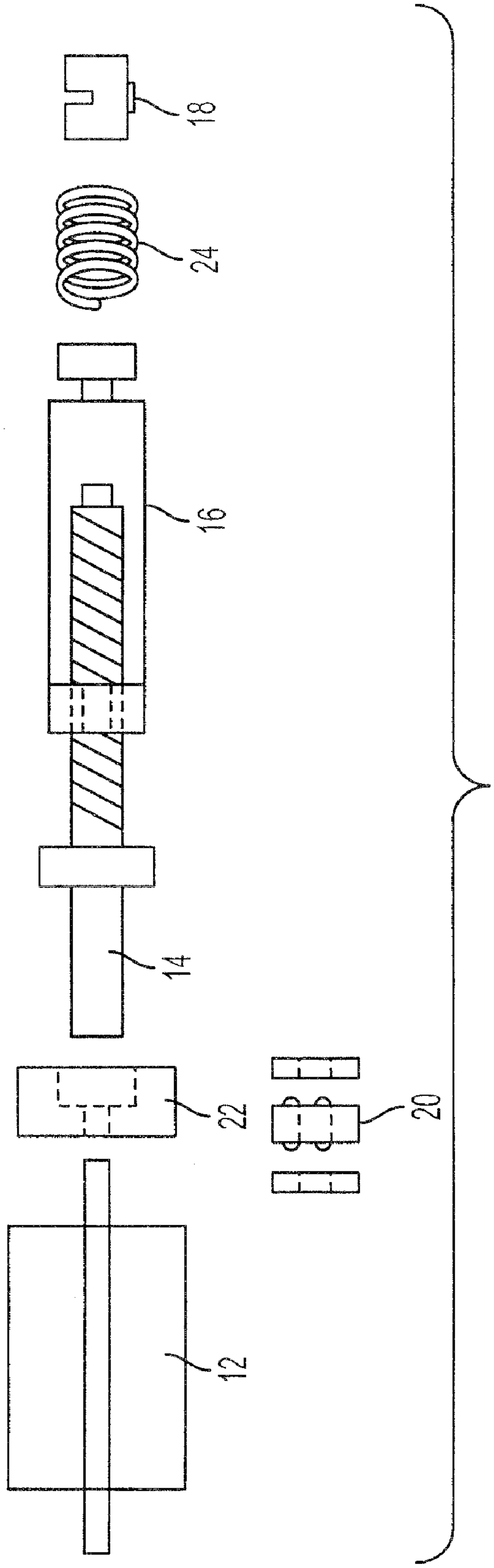
FIG. 1 is an exploded view of one exemplary embodiment of an actuator consistent with the present invention.
Figure 2A:
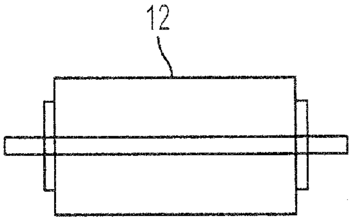
FIGS. 2A-I illustrate components of the exemplary actuator shown in FIG. 1.
Figure 2B:
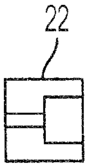
Figure 2C:
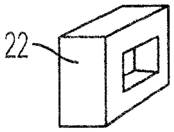
Figure 2D:
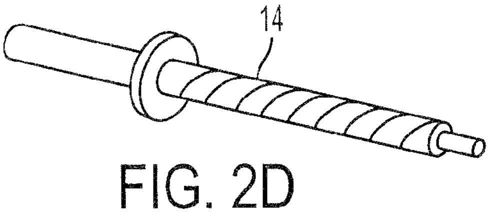
Figure 2E:
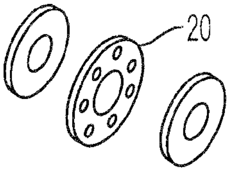
Figure 2F:
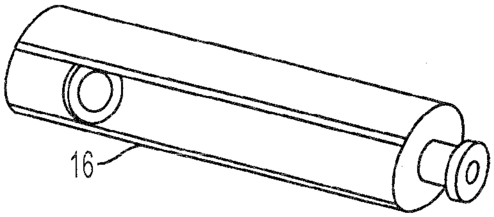
Figure 2G:
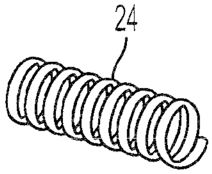
Figure 2H:
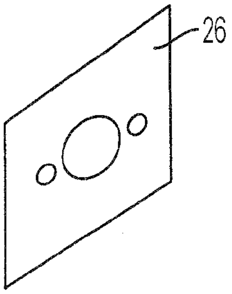
Figure 2I:
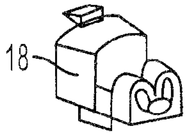

Although the following Detailed Description will proceed with reference being made to illustrative embodiments, many alternatives, modifications, and variations thereof will be apparent to those skilled in the art. Accordingly, it is intended that the subject matter be viewed broadly.

DETAILED DESCRIPTION

For simplicity and ease of explanation, various embodiments will be described herein in connection with a vehicle door system. It is to be understood, however, that illustrated exemplary embodiments described herein are provided only by way of illustration, and are not intended to be limiting, and that an actuator consistent with the invention may be used in systems other than vehicle door systems.

Various embodiments of actuators consistent with the present invention are illustrated and described herein. The actuator may be configured to actuate very quickly. According to one embodiment, for example, by coupling the motor directly to the drive screw, this actuator may actuate in very short amount of time, e.g. 50 ms or less in one embodiment. The time for actuation may be modified to meet design requirements.

Referring to FIGS. 1 through 4, an embodiment of an actuator 10 may generally include a motor 12 configured for rotatably driving a screw 14. The screw 14 may be coupled to a slider 16 to produce generally linear travel of the slider 16. The slider 16 may be coupled to an end effector 18, which may be coupled to a lock or opening system for unlocking or opening a door, hatch, etc. The motor 12, screw 14, and/or slider 16 may be variously supported by an actuator housing 13, shown, e.g., in FIG. 5. For example, the motor 12 may be supported, at least in part, by a motor support plate 26. The motor support plate 26 may be coupled to the motor 12 to support the motor 12 and prevent rotation of the motor body. Of course, an actuator consistent with the present disclosure may be employed in various other applications.

As shown, the motor 12 may be coupled directly to a drive screw 14 without intermediate gear train, which may reduce noise of the actuator 10. The actuator 10 may use one, or more, sets of thrust ball bearings 20 to take the load for both retract and extend of actuator 10. The set of thrust ball bearings 20 may be designed to reduce wear and increase life of the actuator 10, and may increase the efficiency of the screw 14, e.g., by reducing drag loss. As shown, cooperating washers may be associated with the thrust ball bearings 20, e.g., to provide thrust receiving members. Of course, other arrangements may also be employed.

The actuator 10 may incorporate a coupler 22 between motor 12 and drive screw 14 to eliminate any axial loading feeding back to the motor 12, especially shock loading. The coupler 22 may be coupled to the screw 14 with a clearance fit allowing axial movement of the screw 14 relative to the coupler 22. For example, the coupler 22 may include a square pocket, splined or keyed opening, etc. to allow torque from the motor 12 to be transmitted to the screw 14 via a complimentary engaging portion. In the foregoing manner, torque may be transmitted from the motor 12 to the screw 14 while still allowing relative axial movement between the motor 12 and the screw 14. The motor 12 may be press fit to the output shaft of the motor 12, or may be coupled to the motor 12 in a similar manner as to the screw 14.

The end effector 18 may allow the actuator 10 to be decoupled from cable attachment yoke, such that the actuator drive train is not back driven by door handle when the door is manually opened. The actuator 10 may additionally include a spring, such as compression spring 24 biasing the actuator 10, e.g. the slider 16, toward a resting or initial position. For example, when the actuator 10 is driven to lock or unlock a door, e.g. by linear motion of the slider, the spring 24 may be loaded, e.g., compressed. Once the actuator 10 has locked or unlocked the door and the actuator 10 is no longer energized, the spring 24 may drive the actuator 10 to the initial position, e.g., by acting against the slider 16. Various alternative configurations may also be employed to achieve the return to a resting position.

Figure 3A:
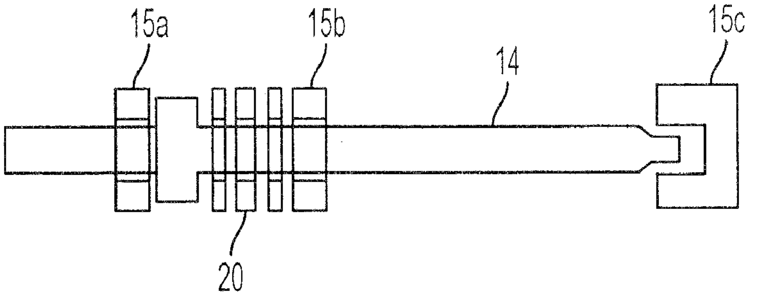
FIGS. 3A-B illustrate housing features useful in connection with an actuator consistent with the present invention.
Figure 3B:
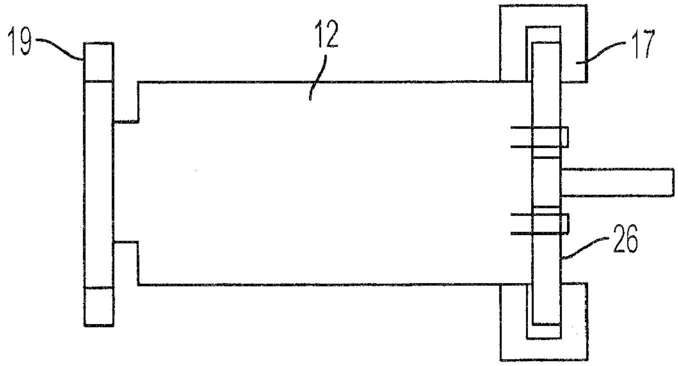
Figure 4:
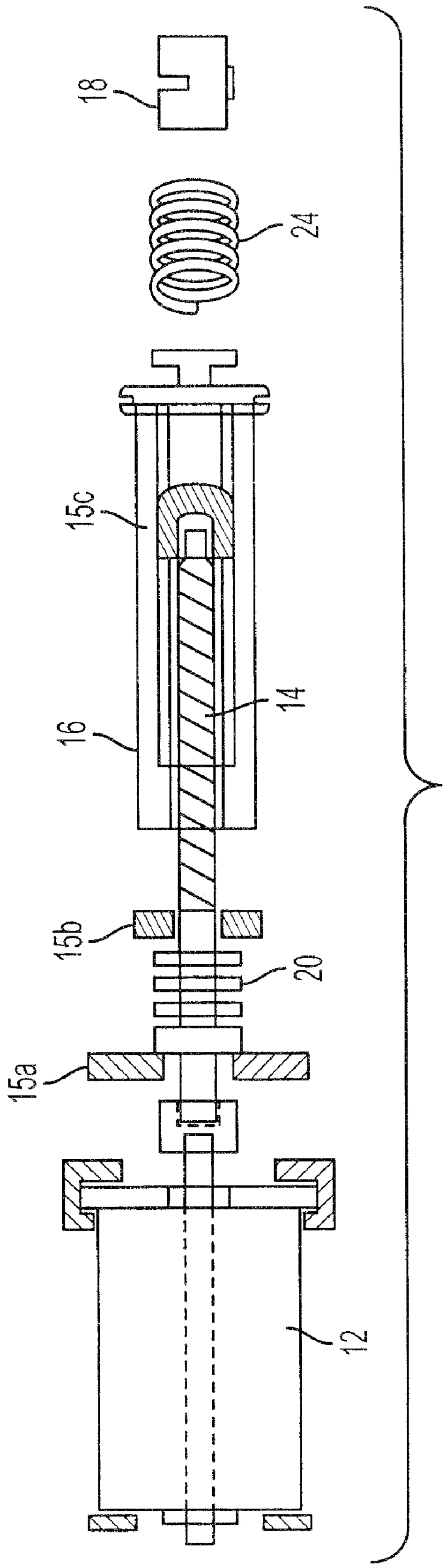
FIG. 4 is plan view of an exemplary embodiment of an actuator consistent with the present invention.

As shown in FIGS. 3A and 3B, components of the actuator 10 may be supported, either directly or indirectly, by features of an actuator housing 13. For example, the housing 13 may include supports 15*a-c* for the screw 14. The supports 15*a-c* may, for example, maintain the screw in position relative to the slider 16 and the motor 12, etc. Similarly, the housing 13 may include front and rear motor supports 17, 19. The front motor support 17 may support the motor 12 indirectly by supporting the motor mounting plate 26. Various other suitable mounting arrangements may also be employed.

Referring to FIGS. 5 through 10, an actuator 10 herein may be coupled to a latch, lock, etc., via a pivot arm 28. For example, the actuator 10 may be coupled to a pivot arm 28 via a connecting rod 30, cable, etc. The pivot arm 28 may further be coupled to a latch 31, etc., via a latch connecting rod 32, cable, etc. Similarly, a handle 33, e.g., an inside door handle, may be coupled to the latch, etc., via a handle connecting rod 34, cable, etc., and the pivot arm 28. In such an embodiment, the latch, etc., may be actuated by either a handle or the actuator 10. Taking advantage of the relatively long linear travel available from the actuator 10, the pivot arm 28 may provide mechanical advantage to reduce the force required by the actuator to perform its operation, e.g., to actuate the latch. In one embodiment, the movement of the pivot arm 28 may be at least partially constrained or controlled by a guide pin 36 of the pivot arm traveling in a groove 38 or slot in a mounting plate 40.

Figure 5:
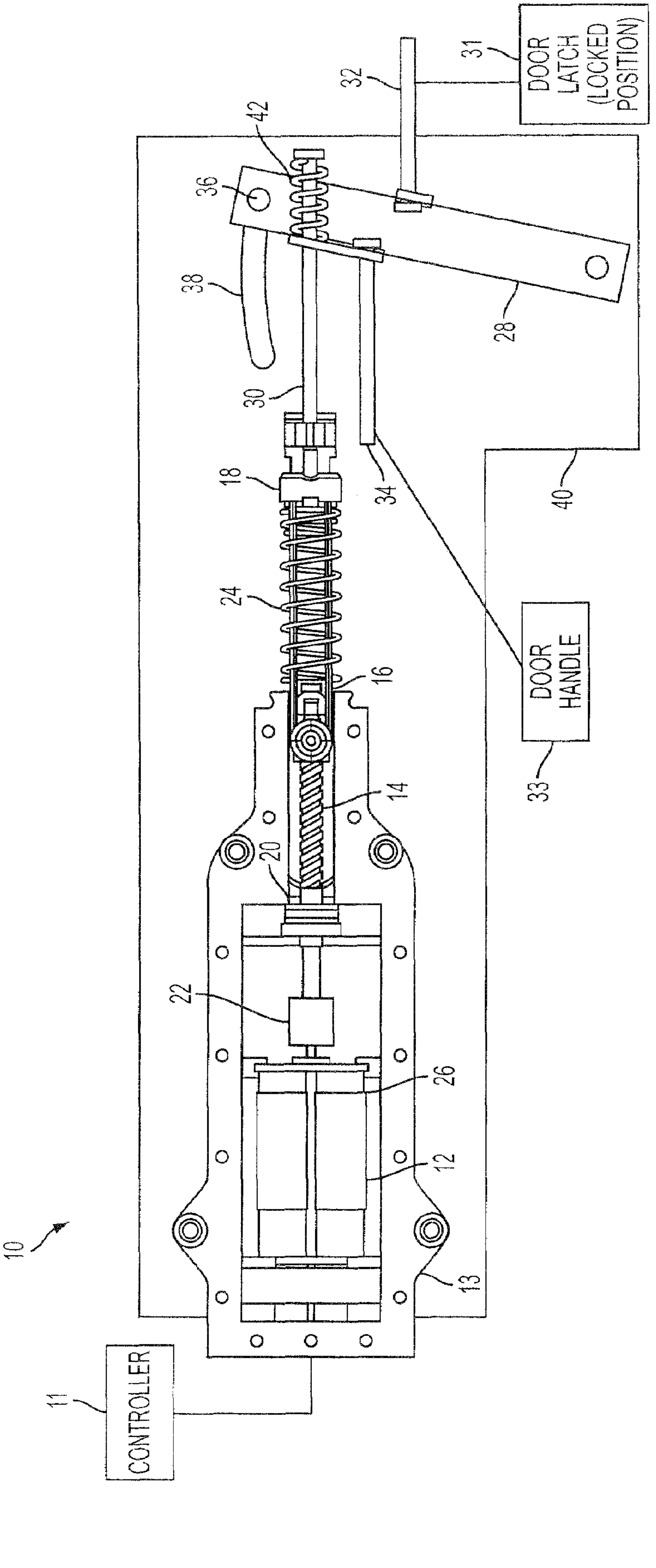
FIG. 5 illustrates an exemplary embodiment of an actuator consistent with the present invention in a resting position.
Figure 6:
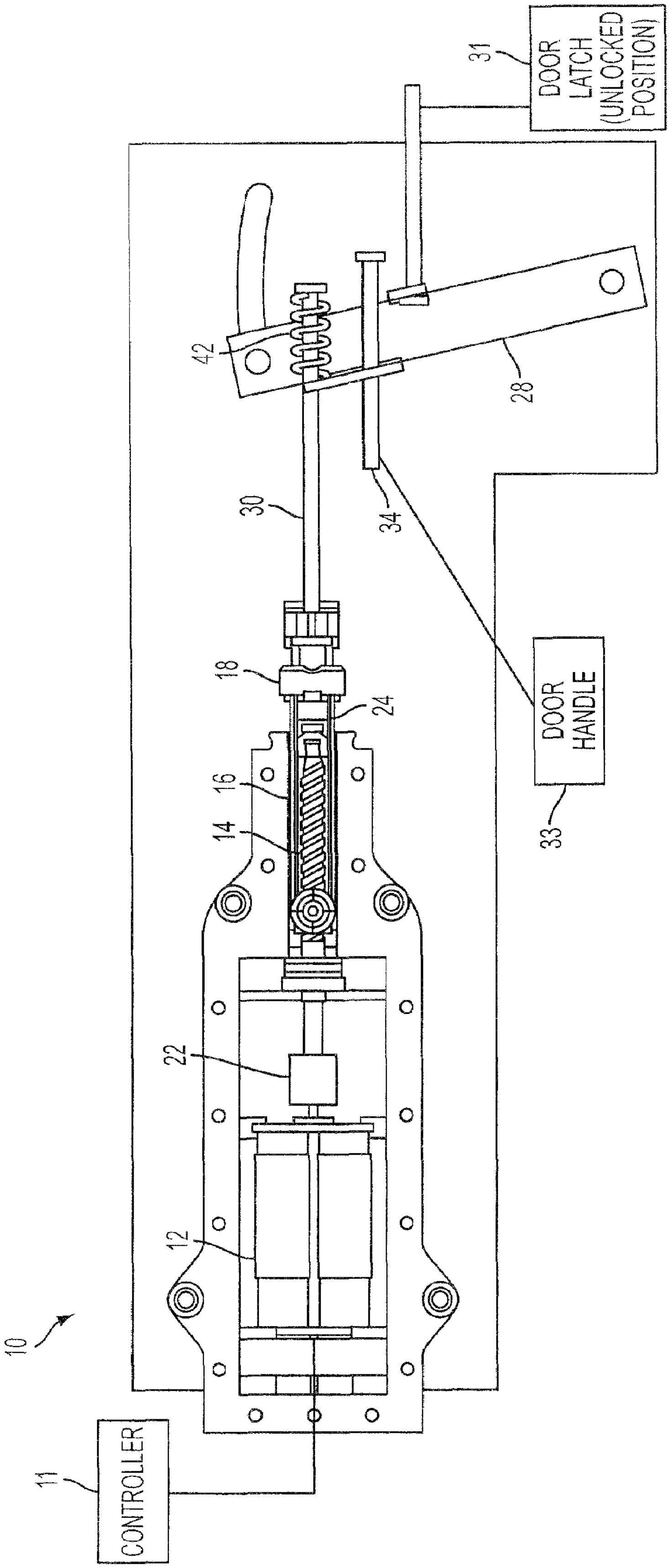
FIG. 6 illustrates the actuator of FIG. 5 in a power actuated position.

The actuator is shown in a resting position in FIG. 5. In the resting position, for example, the door may be in a latched, locked, etc., condition. Turning to FIG. 6, the actuator 10 may be operated to engage the latch. In the illustrated exemplary embodiment, the motor may be energized by a control signal from a controller 11. The controller 11 may include a microcontroller and may be configured to control energization of the motor in response to a signal from an operator key fob, keyless entry key pad, etc. In the illustrated embodiment, when the motor 12 is energized in a first direction, the slider 16 may be driven by the drive screw 14. The slider 16 may pull on the connecting rod 30 to actuate the latch. The connecting rod 30 may be coupled to the pivot arm 28 via a spring 42, or other compliant or buffering element, to reduce an impact force experienced by the actuator 10 at the end of travel of the pivot arm 28. The spring 42 may also take up any extra travel that the actuator has to cover for mechanical tolerance stack up. The handle connecting rod 34 may be coupled to the pivot arm 28 such that the handle connecting rod 34 need not move when the latch is operated by the actuator 10. As the slider 16 travels to actuate the latch, the compression spring 24 may be compressed. Once the latch has been actuated, the motor 12 may be deenergized, and the compression spring may drive the slider 16 back to the resting position, which is shown in FIG. 5.

Figure 7:
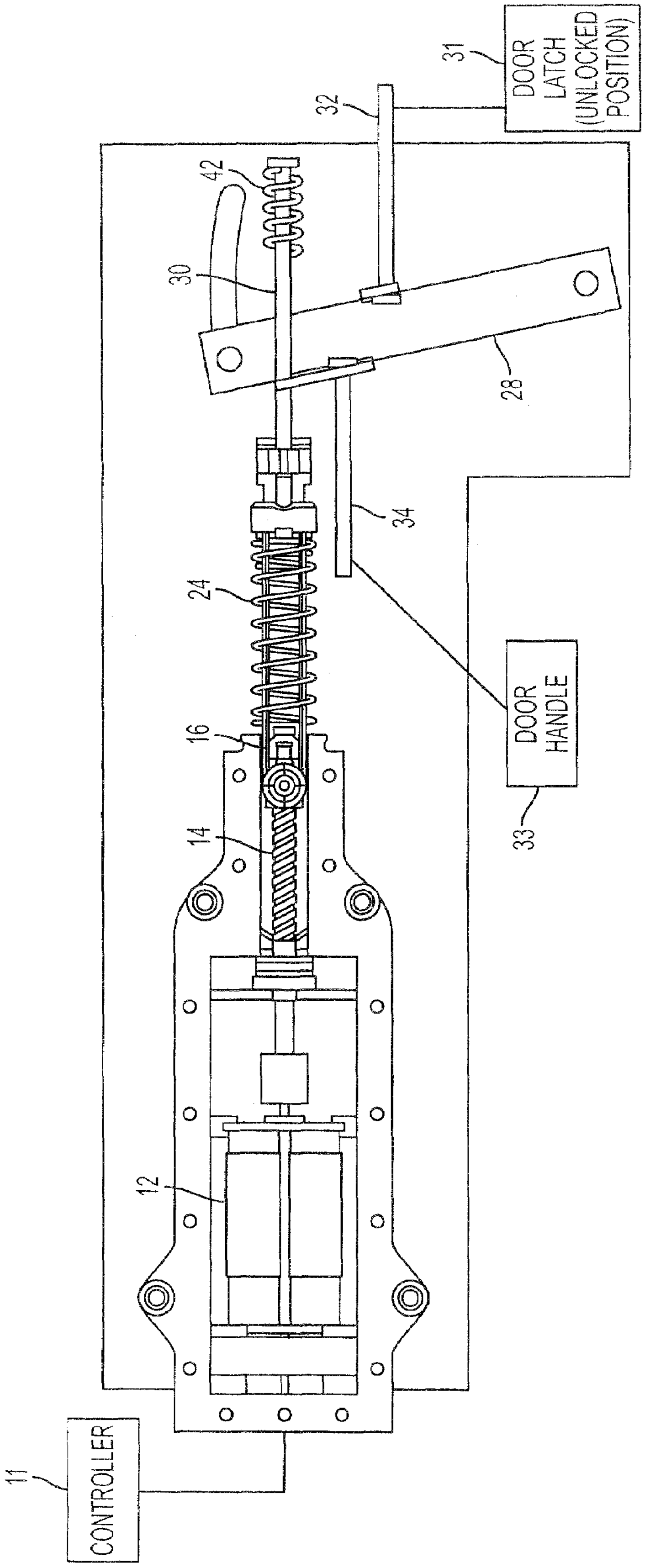
FIG. 7 illustrates the actuator of FIG. 5 in an IS handle actuated position.
Figure 8:
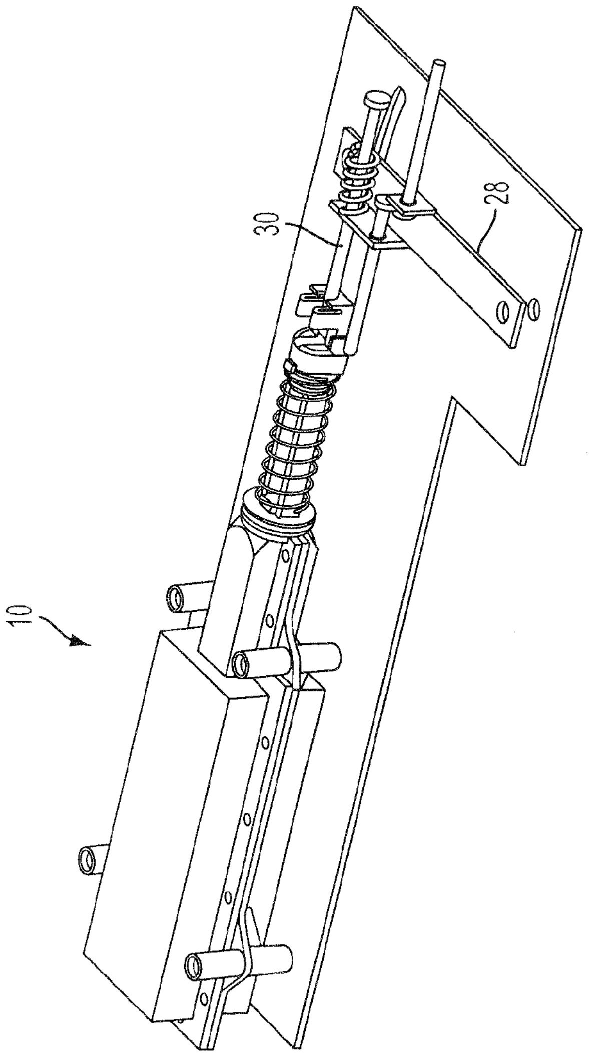
FIG. 8 is an isometric view of the actuator of FIG. 5.
Figure 9:
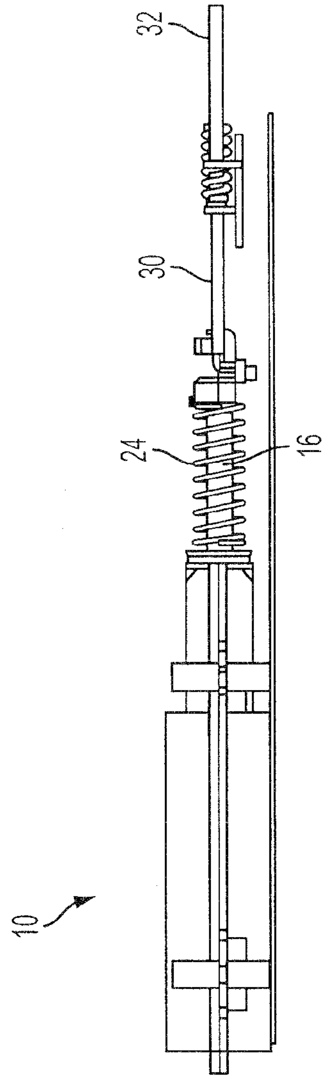
FIG. 9 is a side view of the actuator of FIG. 5.
Figure 10:
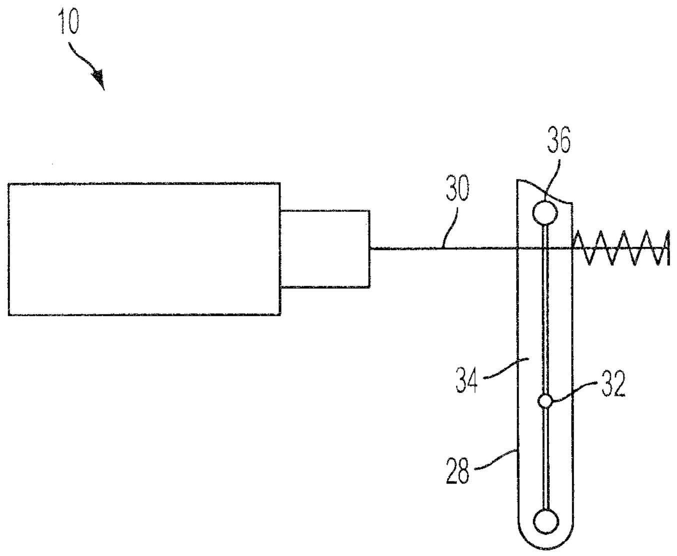
FIG. 10 diagrammatically illustrates an embodiment of an actuator consistent with the present invention.

As shown in FIG. 7, the latch may also be manually actuated. The handle connecting rod 34 may be pulled, e.g., by a handle etc., to move the pivot arm 28, and thereby the latch connecting rod, to the actuated position. As shown, the actuator 10 may be coupled to the pivot arm 28 such that the actuator is not driven during manual actuation of the latch. As shown, the actuator and the connecting rod 30 may remain in the resting position while the pivot arm 28 is moved by the handle connecting rod 34.

Figure 11A:
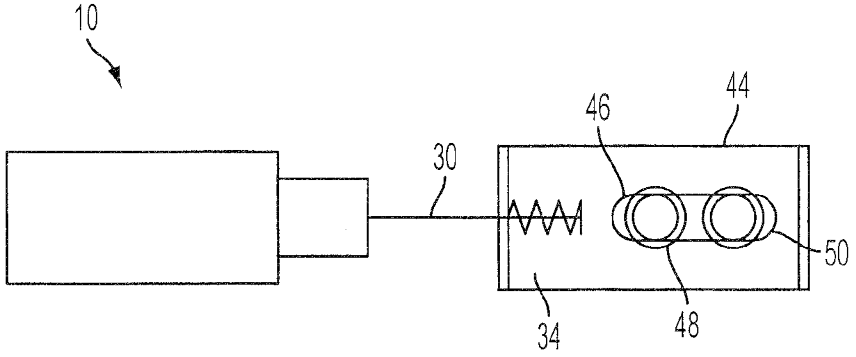
FIGS. 11A-11C diagrammatically illustrate an embodiment of an actuator consistent with the present invention.
Figure 11B:
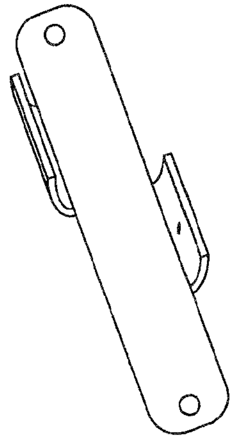
Figure 11C:
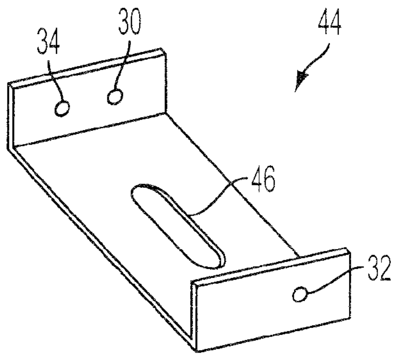
Figure 12:
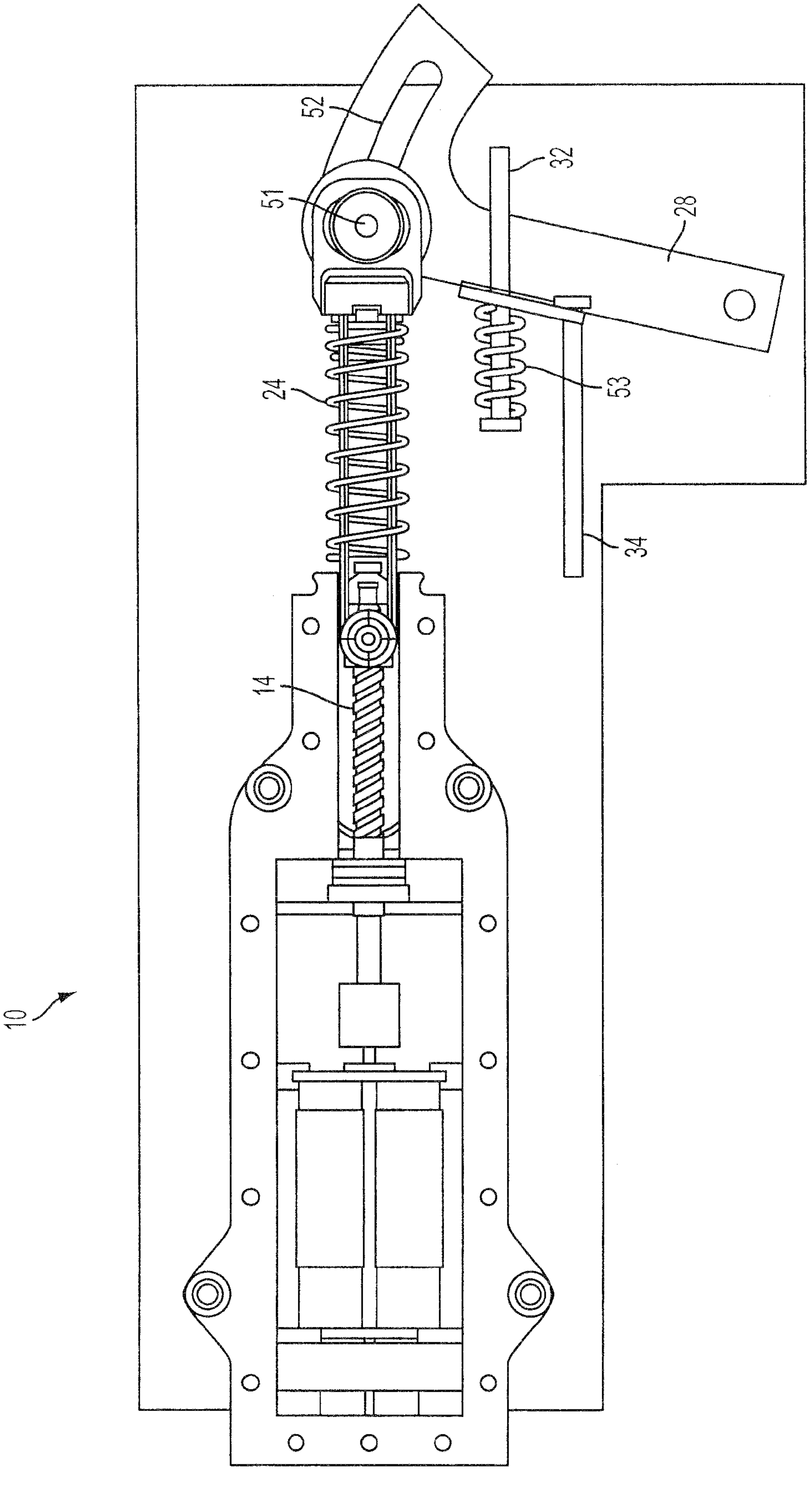
FIG. 12 illustrates another embodiment of an actuator consistent with the present invention in a resting position.

Referring to FIGS. 11A-11B, in another embodiment an actuator 10 may be coupled to a door latch 31 via a slide plate 44. For simplicity, the controller 11, latch 31 and/or the door handle may be omitted from the illustration of various embodiments herein. It is to be understood, however, that such embodiments may include a controller 11 for controlling energization of the motor and may be coupled to a door latch, e.g. via rod 32, plate 44, etc., and a door handle, e.g. view rod 34, plate 44, etc.

In the illustrated exemplary embodiment, the motor 12 may be coupled to the slide plate 44 via a connecting rod 30. The slide plate 44 may be coupled to the latch 31 and to a manual actuation handle 33 via respective connecting rods 32, 34, similar to previously described embodiments. The guide plate 44 may include a slot 48 with one or more pins, rollers, etc., 48, 50 received therein for controlling the range of movement of the slide plate 44 and to prevent side loading. An embodiment utilizing a slide plate 44 may permit the use of an actuator 10 providing a relatively shorter linear travel.

Consistent with the arrangements depicted in FIGS. 5 through 11B, the actuator may be configured to allow user to operate the latch 31 between locked and unlocked positions either with the actuator 10 or the handle 33. The pivot arm configuration and the sliding plate configuration may each allow for lost motion so that either the actuator or the handle could be operated independently without interference from each other.

FIGS. 12-20 illustrate actuator configurations allowing a compact actuator package. The actuator 10 may be coupled to an actuating linkage, such as a pivot arm 28, without intermediate features, such as a connector rod. In the embodiment shown in FIGS. 12-14 the slider 16 is coupled to the pivot arm 28 by a pin 51, roller, etc. engaged in a slot 52 in the pivot arm 28. The latch connector rod 32 may be coupled to the pivot arm 28 via a spring 53, which may reduce impact loading experienced by the actuator 10 at the end of the latch travel, accommodate differences in pivot arm travel and actuator travel, etc.

Figure 13:
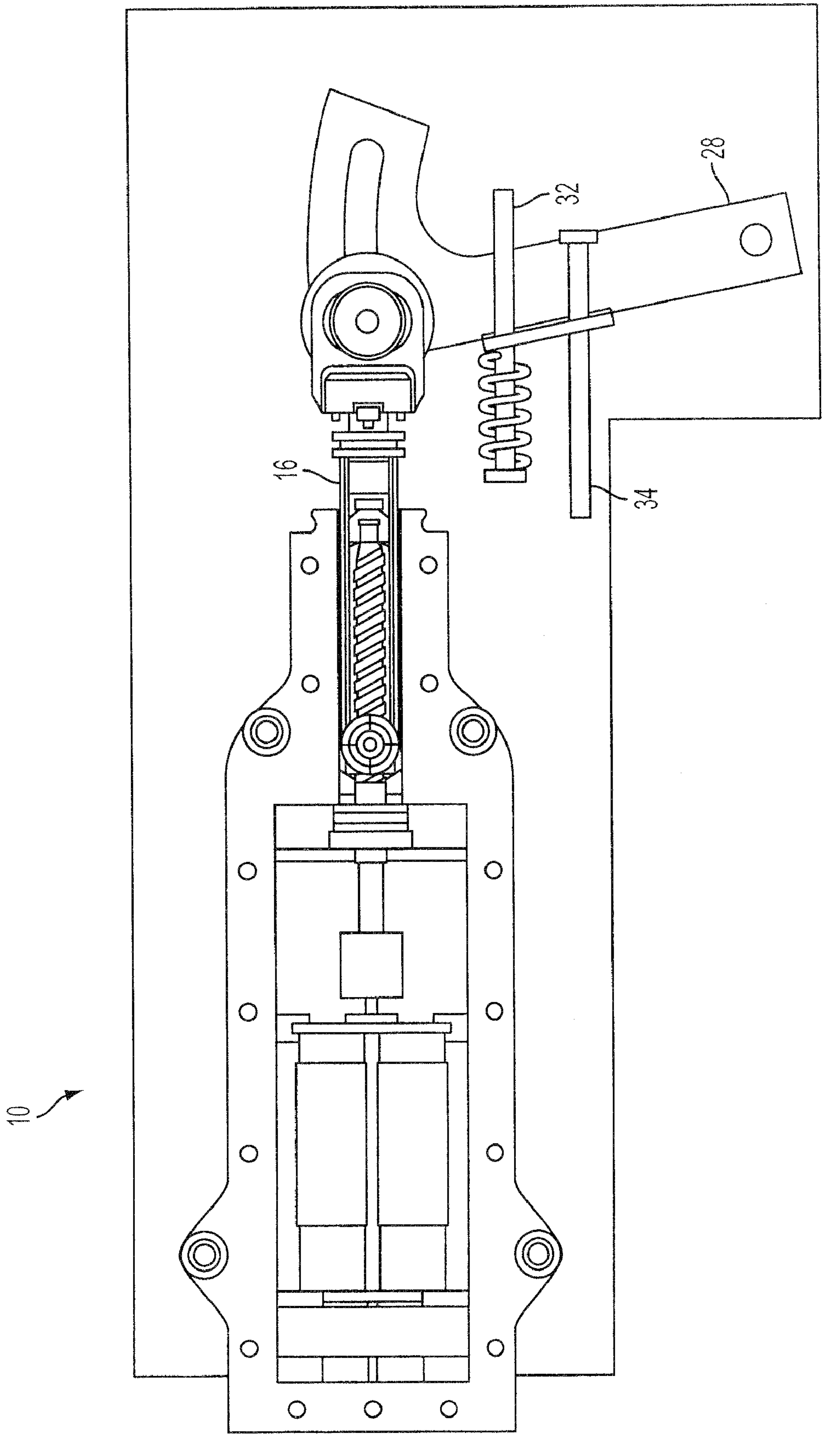
FIG. 13 illustrates the actuator of FIG. 12 in a power actuated position.
Figure 14:
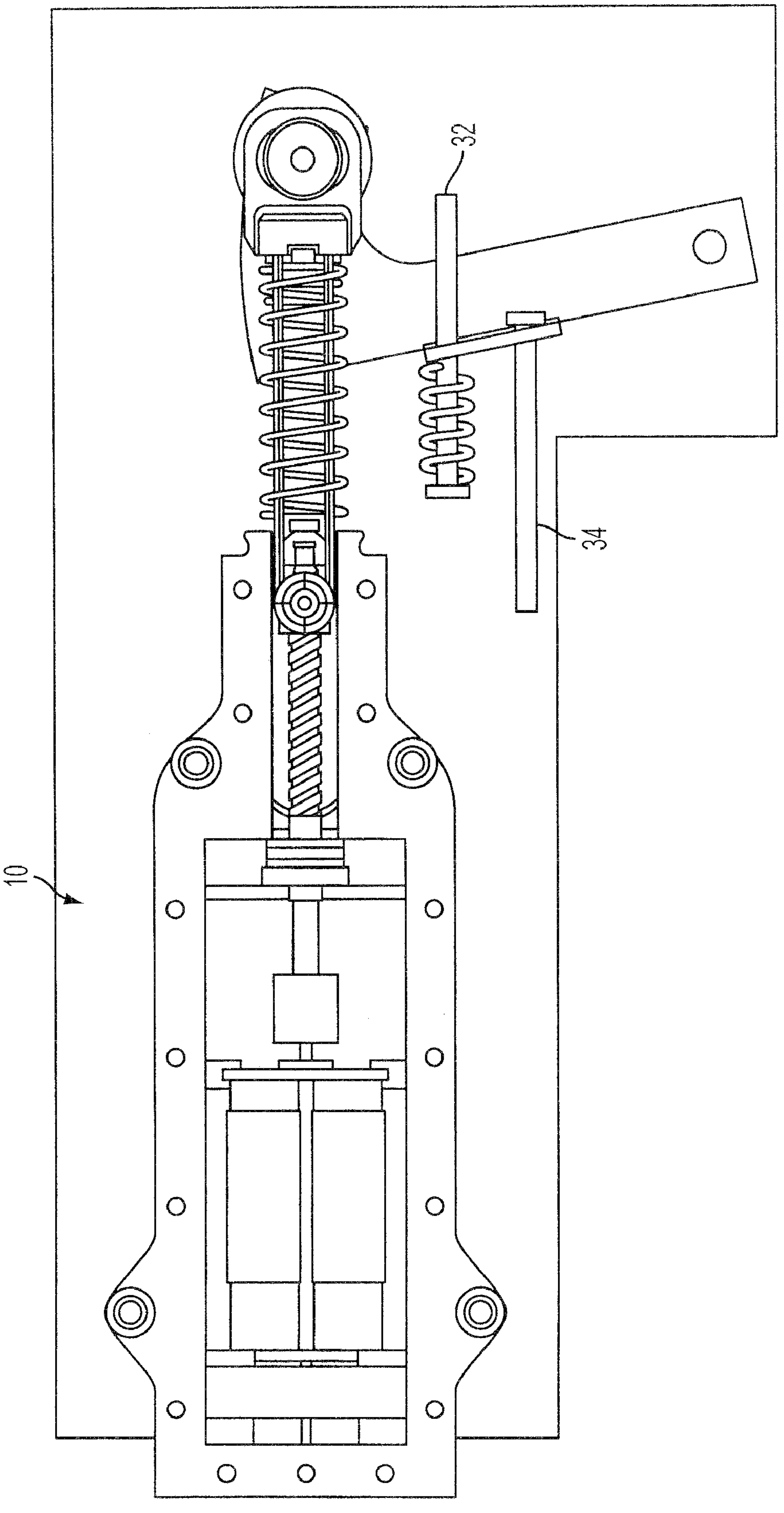
FIG. 14 illustrates the actuator of FIG. 14 in a handle actuated position.

As shown in FIG. 13 when the actuator 10 is energized, axial travel of the slider 16 may pivot the pivot arm 28, which may actuate a latch, etc., coupled via the latch connector rod 32, or other suitable linkage. The connection between the pivot arm 28 and the handle connector rod 34 may allow for lost motion, such that when the latch is actuated by the actuator 10, the handle connector rod 34 may not be driven by the pivot arm 28. Once the latch has been actuated and the actuator 10 is deenergized, the spring 24 may return the actuator to the rest position shown in FIG. 12.

Similar to preceding embodiments, the latch may be manually actuated by a handle, etc., coupled to the handle connector rod 34. The handle connector rod 34 may pivot the pivot arm 28 to actuate the latch via the latch connector rod 32. The slot 52 of the pivot arm may allow for lost motion to prevent the actuator 10 from being driven when the latch is manually actuated by the handle. Accordingly, the actuator 10 may remain in the rest position when the latch is manually actuated.

Figure 15:
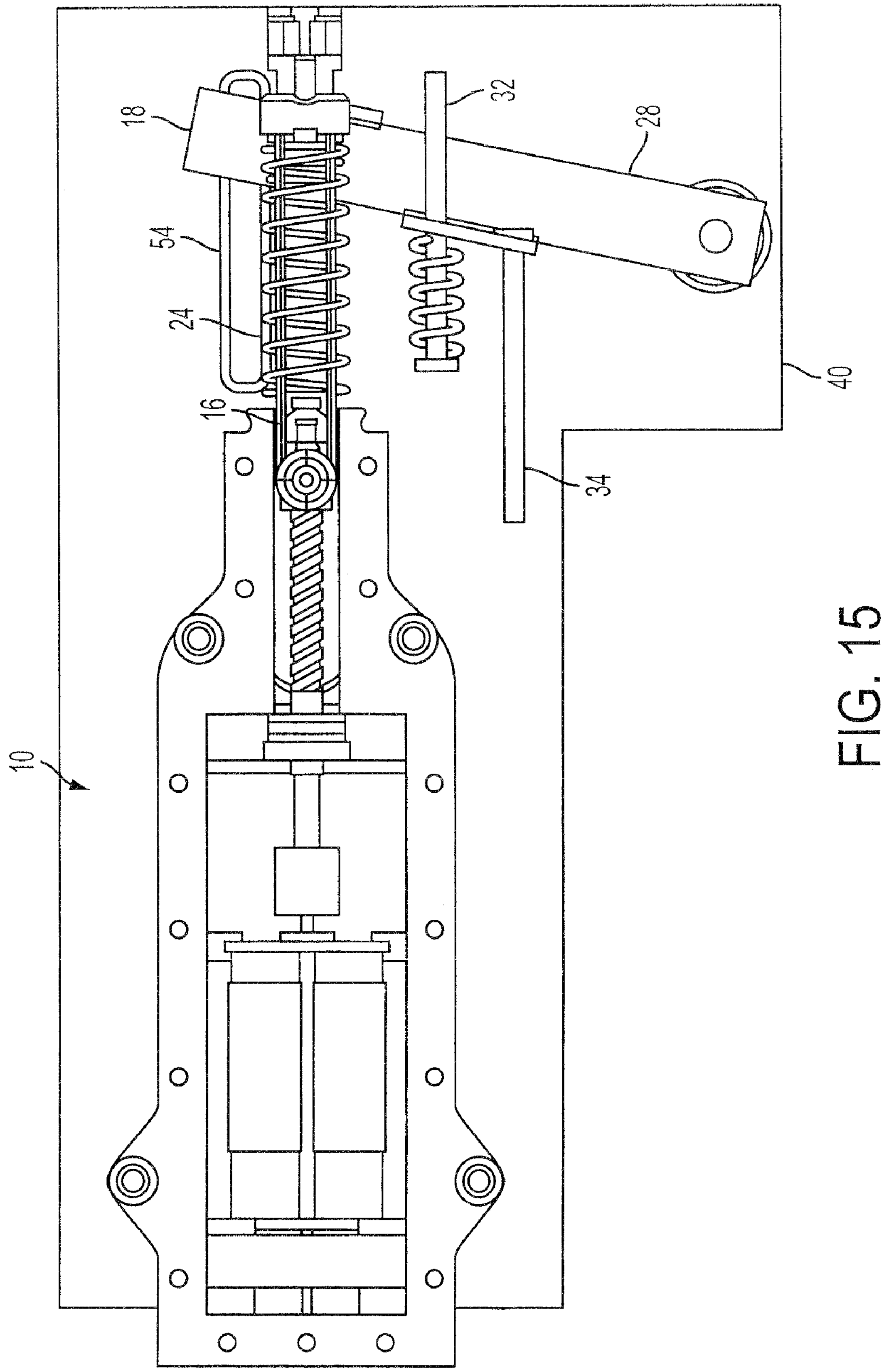
FIG. 15 illustrates another embodiment of an actuator consistent with the present invention in a resting position.
Figure 16:
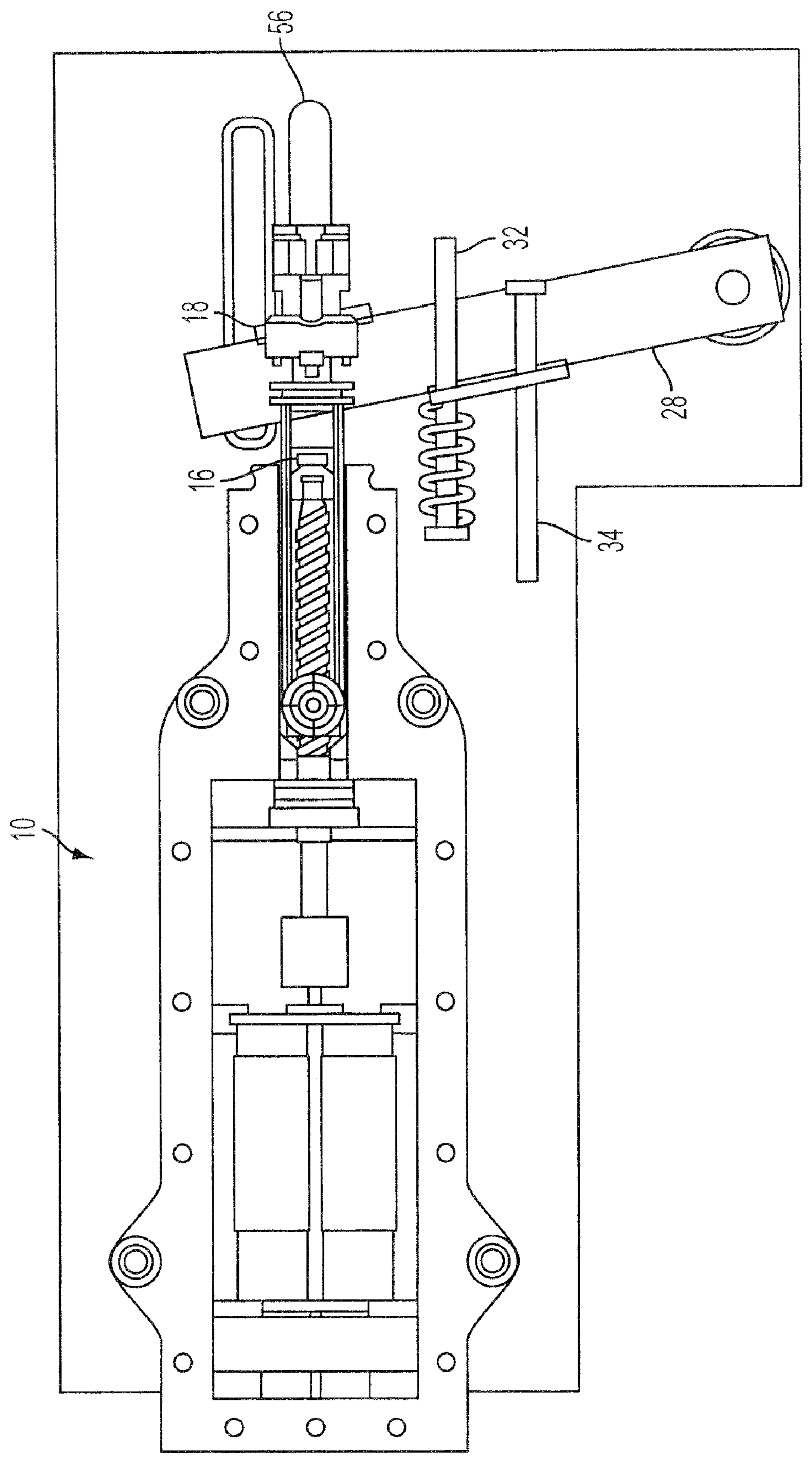
FIG. 16 illustrates the actuator of FIG. 15 in a power actuated position.
Figure 17:
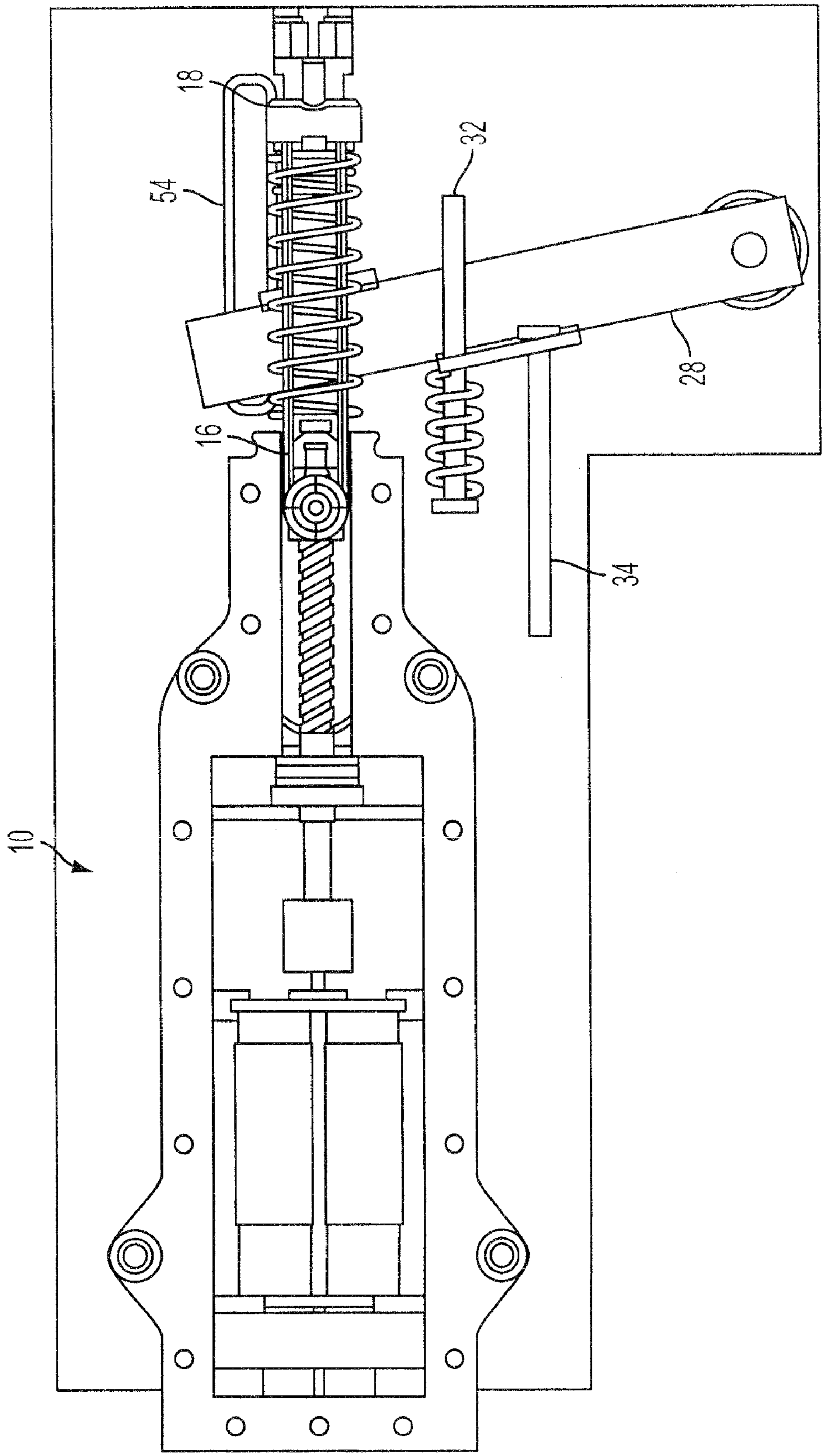
FIG. 17 illustrates the actuator of FIG. 15 in a handle actuated position.
Figure 18:
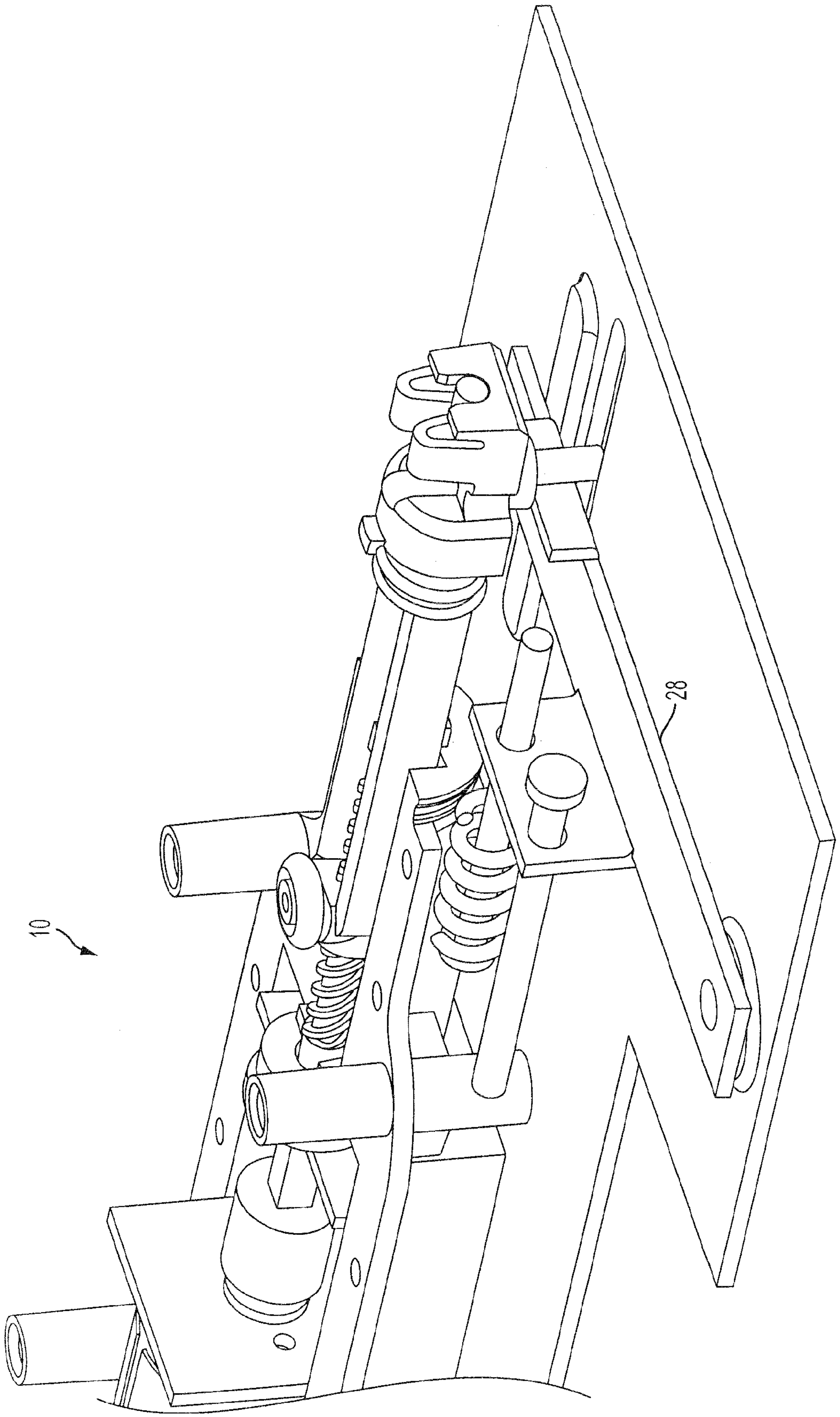
FIG. 18 is an isometric view of the actuator of FIG. 15.

FIGS. 15-18 depict another actuator configuration allowing for a compact actuator package. FIGS. 15, 16, and 17 respectively show the actuator in a rest position, an actuator actuated position, and a manually actuated position. FIG. 18 is an isometric view of a portion of the actuator package. As shown in FIG. 17, when the actuator 10 is energized, linear travel of the slider 16 may pivot the pivot arm 26, e.g., via the effector 18 bearing against a portion of the pivot arm 28, or similar arrangement. Travel of the pivot arm 28 may be guided by a feature of the pivot arm 28 engaged in a slot 54 in the mounting plate 40. Similarly, the linear path of the slider 16 may be guided by another slot 56 in the mounting plate 40 and a cooperating feature of the slider 16, effector 18, etc. The handle connector rod 34 may be coupled to the pivot arm 28 to allow for lost motion when the latch is actuated by the actuator. Similarly, when the latch is actuated by the handle, via the handle connector rod 34, lost motion may be allowed between the actuator 10 and the pivot arm 28, such that the actuator is not driven by the motion of the pivot arm 28 when the latch is manually actuated.

Figure 19:
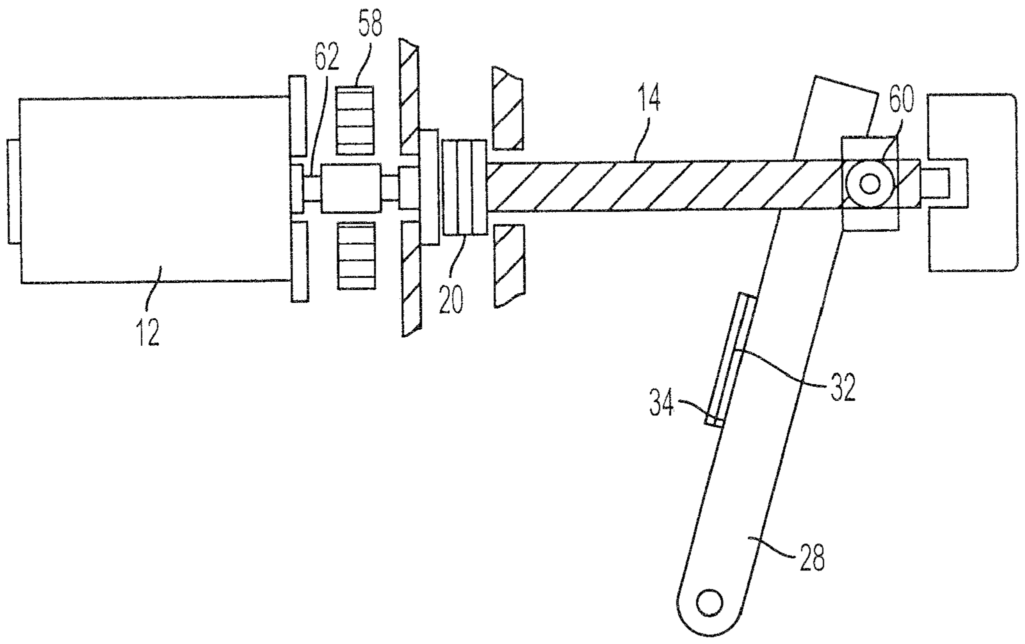
FIG. 19 diagrammatically illustrates another embodiment of an actuator consistent with the present invention.
Figure 20:
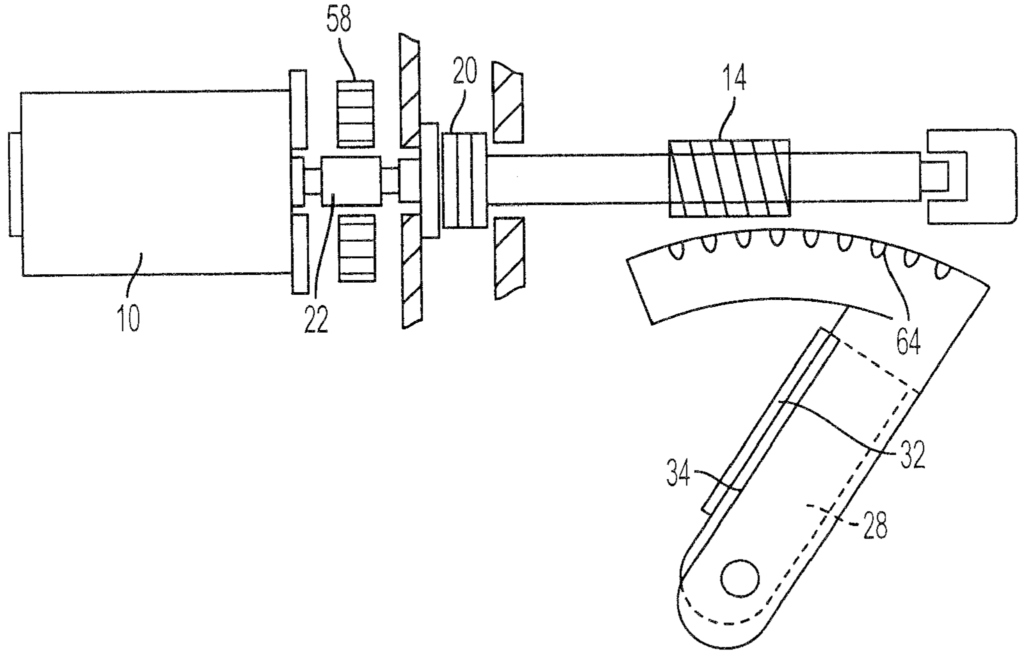
FIG. 20 diagrammatically illustrates another embodiment of an actuator consistent with the present invention.

FIG. 19 depicts an actuator configuration in which a nut 60 is threadably engaged with the actuator screw 14. The nut 60 is further coupled to, or bears against, the pivot arm 28. When the actuator is energized the nut 60 may be linearly driven along the screw 14 by the rotation of the screw 14. The linear travel of the nut 60 may pivot the pivot arm 28 to actuate the latch, e.g., coupled via a latch connector rod 32, etc. Similar with other embodiments herein, the latch may be manually actuated, for example, by a handle connector rod 34 which may pivot the pivot arm 28 to actuate the latch. The nut 60 and the handle connector rod 34 may be configured to allow lost motion so that the handle and the actuator are not driven when the latch is actuated by the actuator and the handle respectively. According to another aspect, the actuator may include a clock spring 58 coupled to the coupling 22, motor shaft 62, screw 14, etc. The clock spring 58 may be wound when the actuator is energized, and may drive the actuator back to a rest position when the actuator is deenergized. The use of the clock spring 58 to rotatably drive the actuator back to a rest position may allow a screw 14 having a lower lead angle to be employed, than would be possible with a compression spring linearly driving the slider, etc. back to a rest position. The lower lead angle of the screw may allow the actuator to produce greater output force.

In another embodiment, the pivot arm 28 may include a sector gear portion 64. The actuator drive screw 14 may be configured as a worm gear engaged with the sector gear portion 64 of the pivot arm. When the actuator is energized, the drive screw 14 may pivotally drive the pivot arm 28 to actuate the latch. A clock spring 58 may be coupled to the coupling 22, etc. as described above to rotatably drive the actuator towards the rest position when the actuator is deenergized. The worm of the drive screw may use a relatively low lead angle to produce greater output force because the clock spring rotatably drives the actuator toward the rest position.

Turning to FIGS. 21 through 25, another embodiment of an actuator 100 is shown. As with the preceding embodiments, the actuator 100 may be configured to actuate very quickly. In one embodiment, energy stored, e.g., in a spring 101, may trigger release in a short amount of time. Generally, the actuator 100 may include a disc 102, an energy storage feature 101, a sector gear 104, and a lever arm 106. A door latch 31 may be coupled to the lever arm 106 by a cable 158. The disc 102, gear, such as a sector gear 104, and lever arm 106 may be rotatable about a common axis, e.g., provided by an pivot pin 108, axle, etc. A motor 110 may be coupled to the sector gear 104, e.g., via worm 112, for rotatably driving the sector gear 104. The actuator 100 may also include a lost motion slot 109 associated with one or more of the sector gear 104 and the disc 102.

A first pawl 114 may be coupled to an actuator housing 116. The first pawl 114 may be releasably engageable with a cooperating feature 118, such as a recess, cutout, etc. associated with the disc 102. The first pawl 114 may engage the cooperating feature 118 of the disc 102 to resist rotation of the disc 102 relative to the housing 116 in at least one direction. A second pawl 120 may be associated with the lever arm 106. The second pawl 120 may releasably engage another cooperating feature 122, e.g., a recess, cutout, etc., associated with the disc 102. The second pawl 120 may engage the cooperating feature 122 of the disc 102 to resist rotation of the lever arm 106 and disc 102 relative to one another in at least one direction.

The energy storage feature 101, such as a torsion spring, compression spring, clock spring, etc. may be associated with the disc 102, for storing energy capable of rotating the disc 102 in at least one direction, e.g. to move the lever arm and latch from locked to unlocked positions, when released. In the illustrated exemplary embodiment, the energy storage feature 101 is configured as a spring having a first end 103 coupled to the actuator housing and a second end 105 coupled to the disc 102, for storing energy for rotating the disc 102 and the lever arm relative to the sector gear 104. In such an embodiment rotation of the disc 102 and the sector gear 104 relative to one another in at least a first direction may load the energy storage feature.

Figure 21:
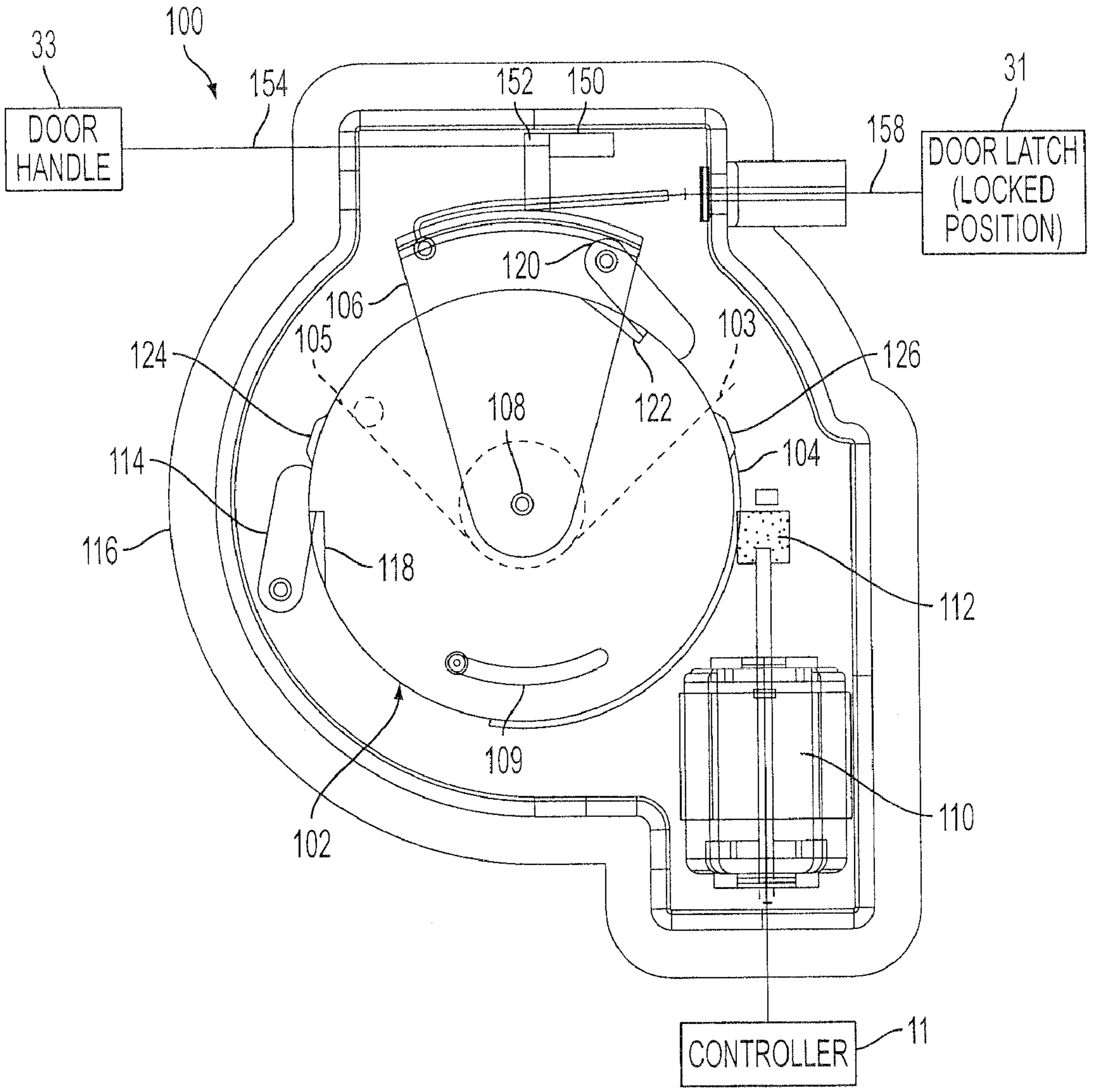
FIG. 21 diagrammatically illustrates another embodiment of an actuator consistent with the present invention in a ready position.
Figure 22:
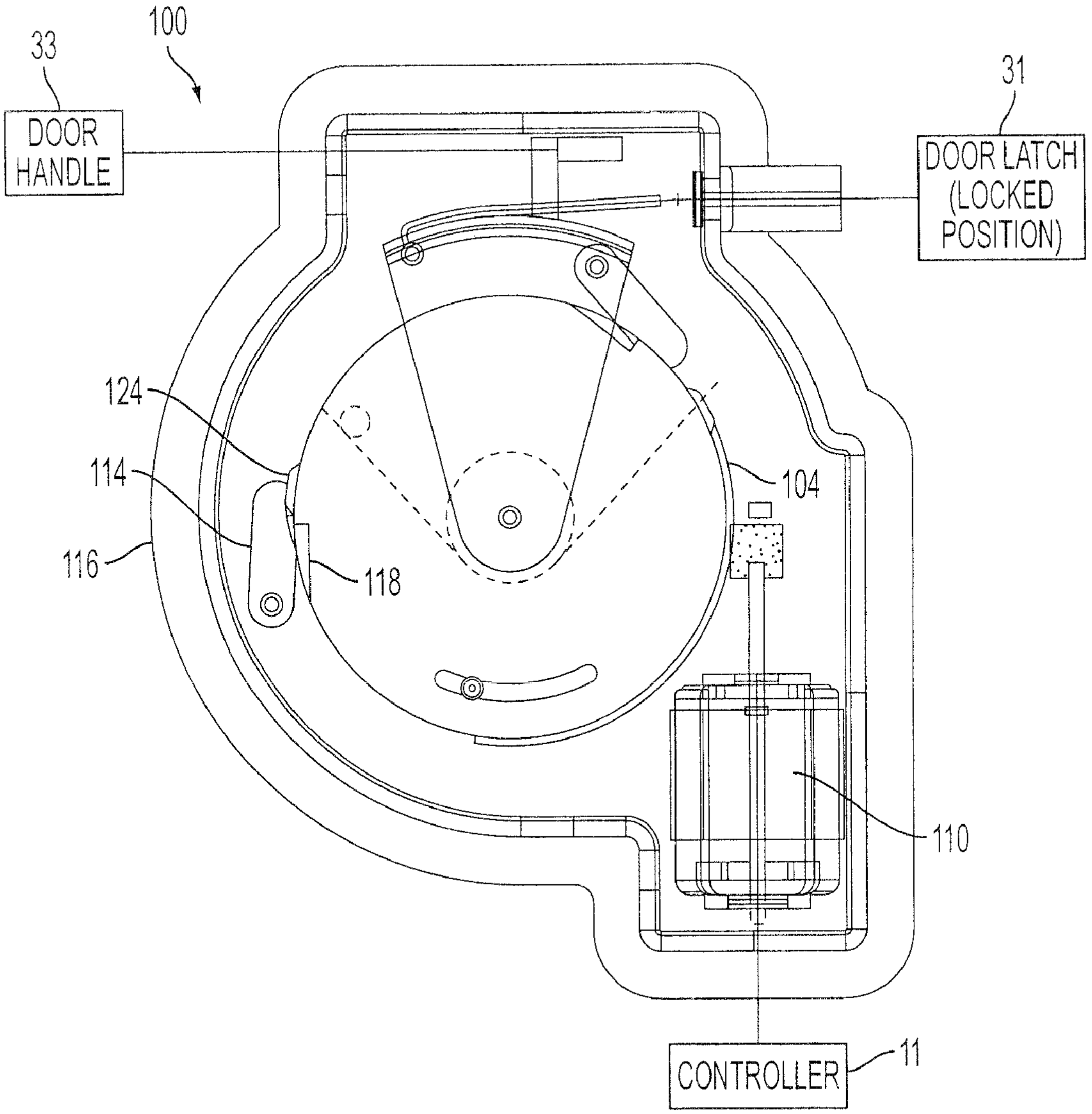
FIG. 22 diagrammatically illustrates the actuator of FIG. 21 in first pawl unlocked position.

According to one embodiment, from the ready position shown in FIG. 21, in which the energy storage feature associated with the disc 102 may be loaded and the lever arm and door latch are in locked positions, the sector gear 104 may be rotated in a first direction, e.g., counter clockwise. For example, the sector gear 104 may be driven counter clockwise by the motor 110. As shown in FIG. 22, a release feature 124 associated with the sector gear 104 may cooperate with the first pawl 114 to release the pawl 114 from engagement with the disc 102, thereby freeing the disc 102 for rotation relative to the housing 116.

Figure 23:
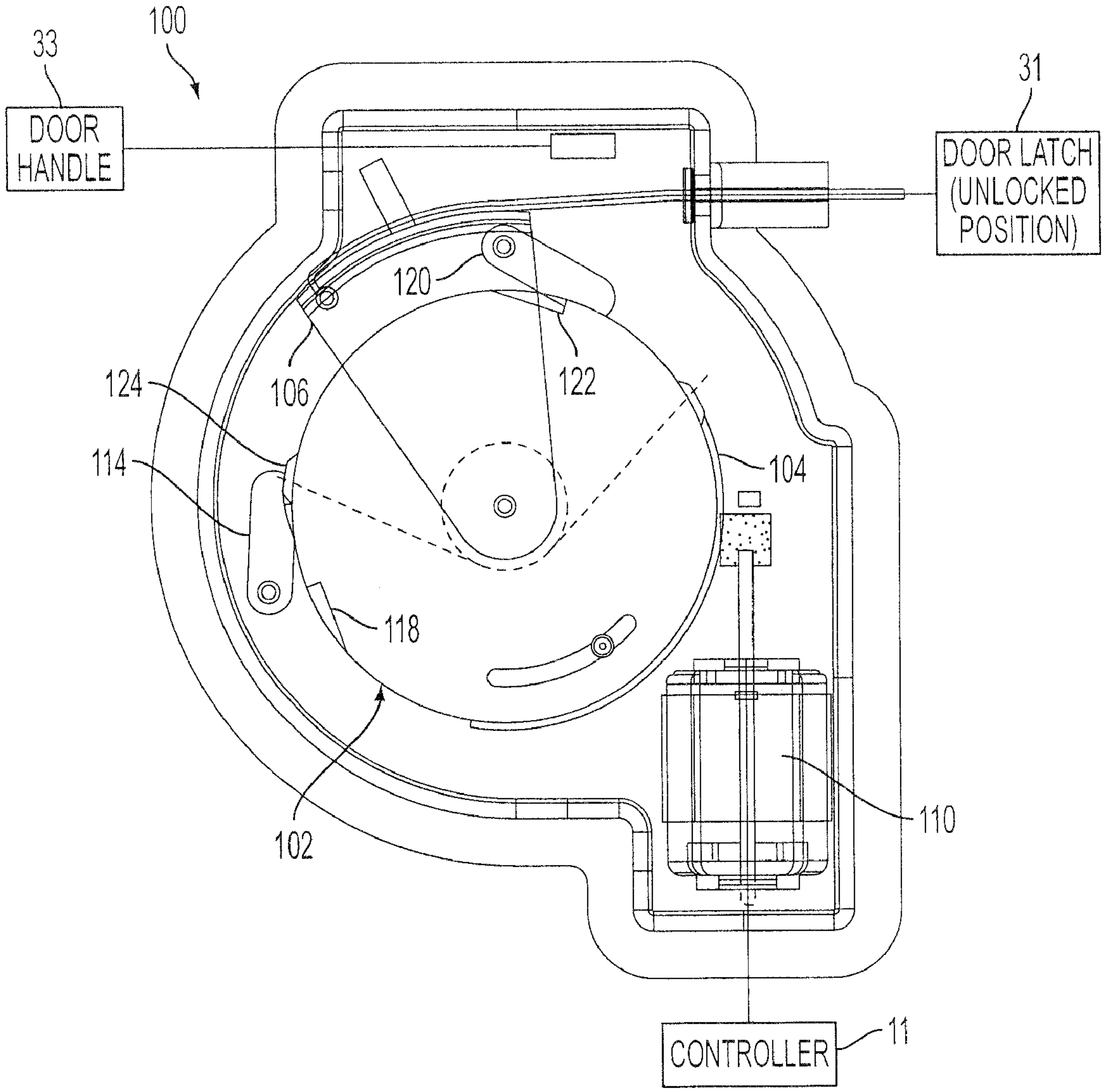
FIG. 23 diagrammatically illustrates the actuator of FIG. 21 in an actuated position.

Turning to FIG. 23, with the first pawl 114 released from the disc 102, the energy stored in the loaded energy storage feature may be released and the disc 102 may be rotated in a counter clockwise direction by the energy storage feature. The lever arm 106 may be rotatably coupled to the disc 102 by engagement between the second pawl 120 and the cooperating feature 122. The lever arm 106 may be rotated in a counter clockwise direction by the disc 102. Rotation of the lever arm 106 may move the lever arm and the door latch to unlocked positions, as shown. Because the rotation of the disc 102 and lever arm 106 may result from release of energy stored by the energy storage feature, e.g., a spring, the actuator may actuate very quickly.

Figure 24:
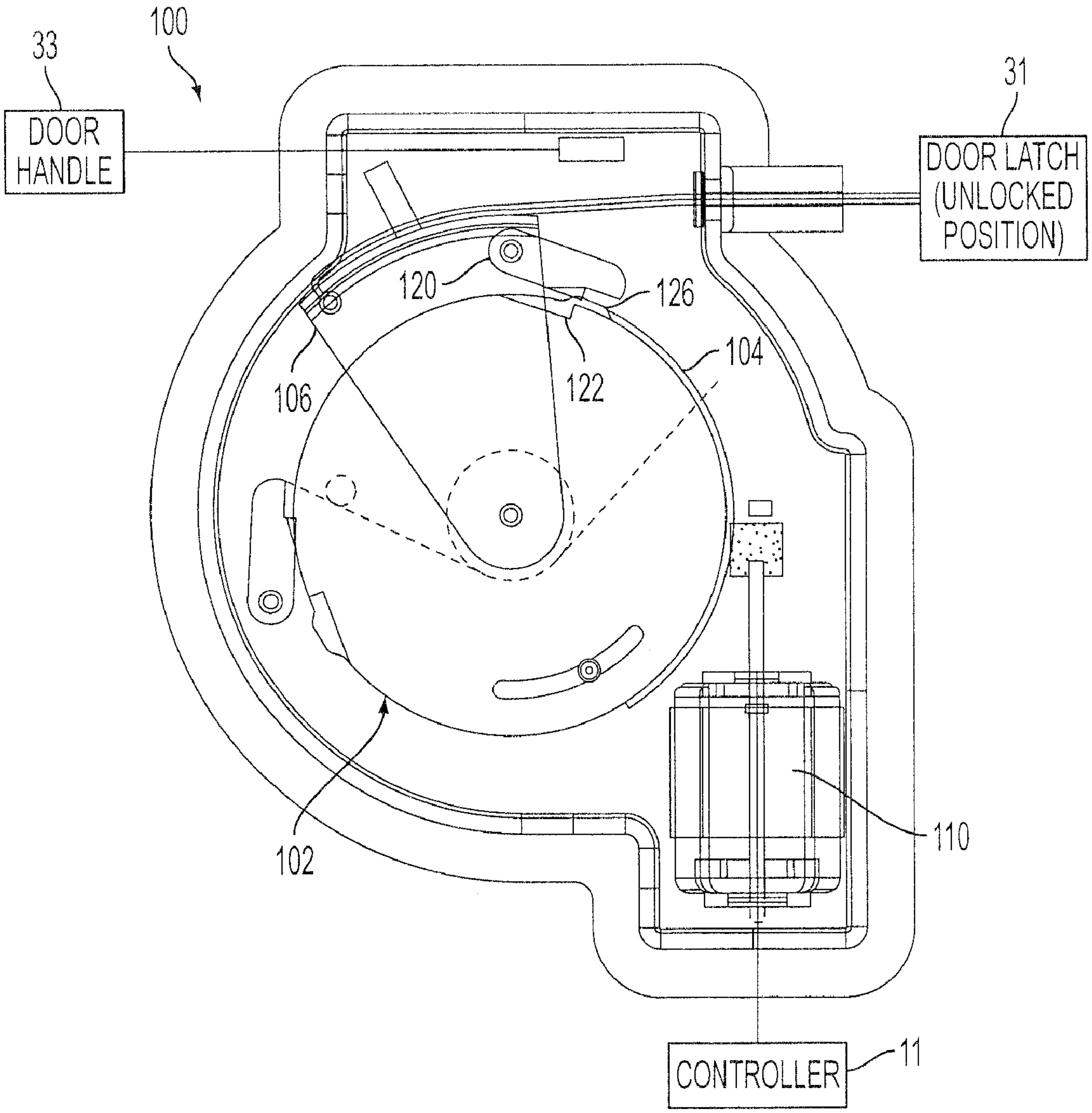
FIG. 24 diagrammatically illustrates the actuator of FIG. 21 in a second pawl unlocked position.

With reference to FIG. 24, after actuation, i.e., rotation of the disc 102 and lever arm 106, the sector gear 104 may continue to be rotated, e.g., by the motor 110. Another release feature 126 associated with the sector gear 104 may cooperate with the second pawl 120, associated with the lever arm 106, to release the second pawl 120 from the cooperating engagement feature 122 of the disc 102. With the second pawl 120 released from the engagement feature 122, the lever arm 106 may rotate independently of the disc 102. In one embodiment, an energy storage feature, such as a torsion spring, compression spring, clock spring, etc., may be associated with the lever arm 106 such that the energy storage feature is loaded when the lever arm 106 is in a rotated position with the disc 102, i.e., when the actuator 100 is in the unlocked or actuated position shown in FIG. 23. In such an embodiment, when the lever arm 106 is disengaged from the disc 102, i.e., when the second pawl 120 is released from the cooperating feature 122 of the disc 102 by the release feature 126, the lever arm 106 may rotate to a ready position by the energy storage feature.

Figure 25:
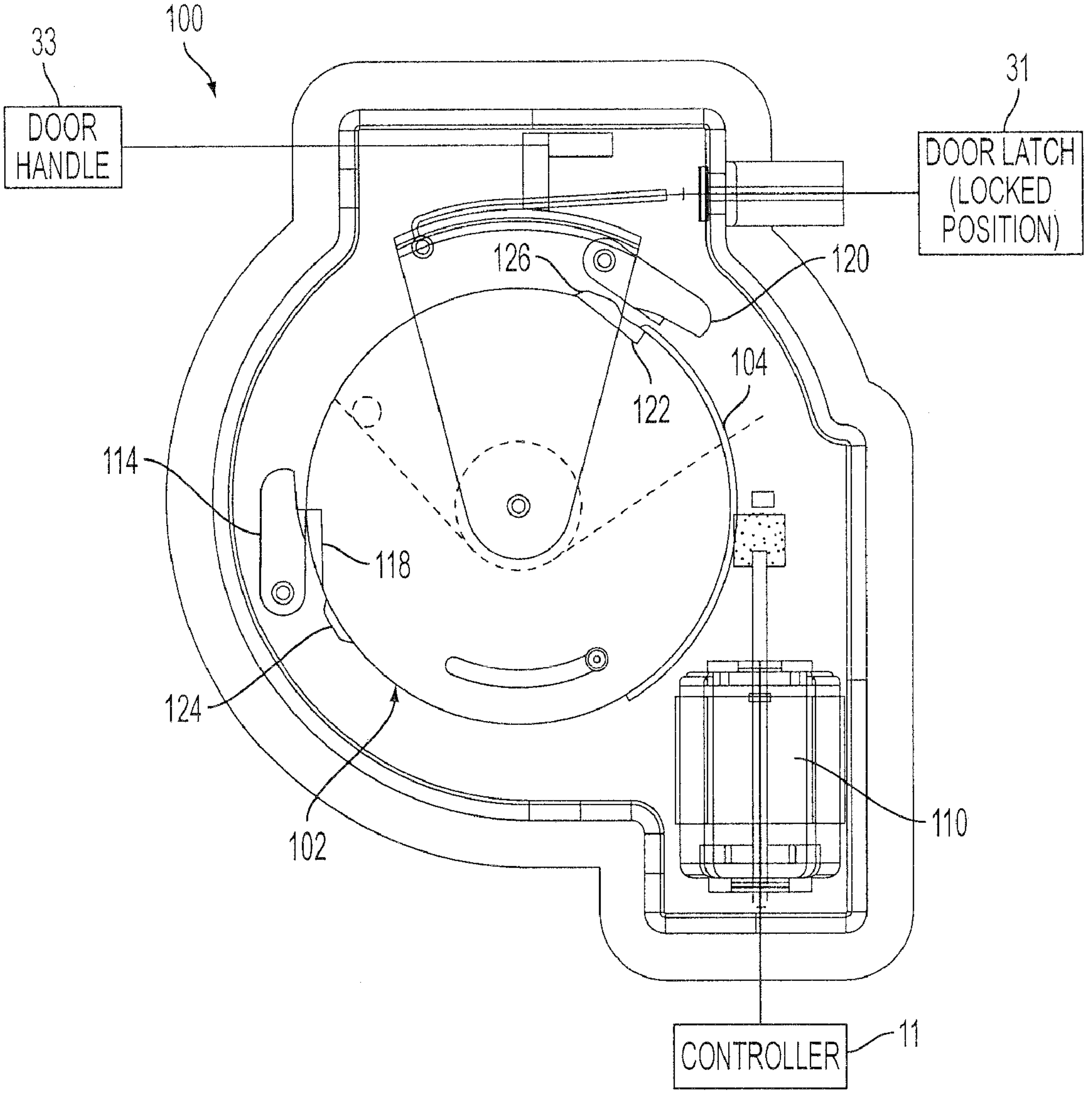
FIG. 25 diagrammatically illustrates the actuator of FIG. 21 in a reset position.

Turning to FIG. 25, the sector gear 104 may be rotated, e.g., by the motor 110, to rotate the disc 102 to align the first and second pawls 114, 120 with the cooperating features 118, 122 of the disc 102. The first and second pawls 114, 120 may be biased toward an engaged position such that the pawls 114, 120 may engage the cooperating features 118, 122 upon alignment therewith. The energy storage feature associated with the disc 102 may be at least partially loaded when the disc 102 is rotated to align at least one of the pawls 114, 120 with the cooperating engagement features 118, 122. In another embodiment, the energy storage feature associated with the disc 102 may be loaded when the sector gear 104 is rotated toward the ready position illustrated in FIG. 21., e.g., during continued rotation of the sector gear 104 after engagement between at least one of the pawls 114, 120 and at least one cooperating feature 118, 122. In an alternative embodiment, the energy storage feature may be loaded when the sector gear 104 is driven to actuate the actuator 100, e.g., is driven to release engagement between the first pawl 114 and the disc 102. Various other arrangements may also suitably be used in connection with the present invention.

Manual actuation of the latch may be achieved through a door handle cable feature 150 positioned to engage a post 152 coupled to the lever arm 106. The feature 150 may be coupled to the door handle 33 by a cable 154. Manually pulling on the door handle 33 when the actuator is in the position illustrated in FIG. 1, may move the lever arm and the door latch to their unlocked positions. As shown in FIG. 23, however, when the latch is actuated by the actuator 100, the feature 150 may stay in its ready position shown in FIG. 21.

Consistent with the foregoing description, according to one aspect, an actuator may be provided that is configured to actuate very quickly. Using energy stored in an energy storage feature, such as a spring, trigger release may be accomplished in a short amount of time. Such an actuator may use a compression spring, torsion spring, combination of both, etc. to store energy on a disc disposed on one side, e.g., a bottom side, of a gear, such as a sector gear. The gear, which may be on top of the disc, may be used to wind up the disc to store energy, e.g., in the energy storage feature.

In an embodiment, the stored energy may be released, e.g., for rotation of the disc in the opposite direction, by release one or more pawls which may engage the disc for resisting rotation of the disc in at least one direction. The disc may rotate a lever arm when the stored energy is released. The gear may be rotated to release a second pawl, e.g., which may coupled the lever arm and the disc for rotation together. The pawls for resisting rotation of the disc in at least one direction and the second pawl, which may couple the lever arm and the disc, may be biased toward an engaged position, e.g., by a torsion spring, compression spring, or other suitable biasing element.

According to another aspect, an energy storage feature associated with the lever arm may urge the lever arm toward a reset position when the second pawl is released. The energy storage feature associated with the lever arm may, therefore, allow the lever arm to reset in a situation in which the disc is stuck in an open position. After actuation, the gear may be rotated to load the energy storage feature associated with the disc and to move the actuator to a reset or to a ready position to prepare for the next release. According to one aspect, a manual override, e.g., in the form of a cable, etc., may be associated with the lever arm.

According to another aspect, there is provided an actuator for controlling the position of a door latch. The actuator includes a lever coupled to the door latch, the lever arm being movable between a first position wherein the door latch is in a locked position and a second position wherein the door latch is in an unlocked position; an energy storage feature coupled to the lever arm, the energy storage feature configured to rotate the lever arm from the first position to the second position when the stored energy is released; and an electric motor configured to drive a gear to load the energy storage feature and to release the stored energy.

According to another aspect, there is provided a method of unlatching a door latch including: coupling the door latch to a lever arm; storing energy in a spring coupled to the lever arm; releasing the energy to allow the spring to move the lever arm and the door latch from a latched position to an unlatched position.

There is thus provided an actuator of simple and reliable configuration. The features described herein may be combined with other features described herein. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An actuator comprising a disc rotatable about an axis;

a first pawl coupled to an actuator housing and releasably engageable with said disc to resist rotation of said disc relative to said housing in at least one direction.

a lever arm rotatable about said axis and coupled to an actuator output;

a second pawl coupled to said lever arm and releasably engagable with said disc to resist rotation of said lever arm relative to said disc in at least one direction;

an energy storage feature coupled to said disc, said energy storage feature rotating said disc in a first direction when said stored energy is released; and a gear rotatable about said axis, said gear comprising a first release capable of disengaging said first pawl from said disc, and a second release feature capable of disengaging said second pawl from said disc;

said gear configured to load said energy storage feature, and release said first pawl permitting rotation of said disc and said lever arm by said energy storage feature, and configured to release said second pawl permitting said lever arm to return to an initial position.

2. The actuator of claim 1, wherein said gear is configured to be rotatably driven by a motor.

3. The actuator of claim 2, further comprising a worm driven by said motor for rotatably driving said gear in at least one direction.

4. The actuator of claim 1, wherein said disc comprises a recess configured to be releasably engaged by said first pawl.

5. The actuator of claim 1, wherein said disc comprises a recess configured to be releasably engaged by said second pawl.

6. The actuator of claim 1, wherein said energy storage feature comprises a spring.

7. The actuator of claim 1, wherein said energy storage feature is coupled between said gear and said disc.

8. The actuator of claim 1, wherein said energy storage feature is coupled between said disc and said actuator housing.

* * * * *